United States Patent
Gehrke

(10) Patent No.: US 9,734,114 B2
(45) Date of Patent: Aug. 15, 2017

(54) FIELD UNIT AND A METHOD FOR OPERATING AN AUTOMATION SYSTEM

(71) Applicant: FESTO AG & Co. KG, Esslingen (DE)

(72) Inventor: Martin Gehrke, Weinstadt (DE)

(73) Assignee: FESTO AG & CO. KG, Esslingen (DE)

( * ) Notice: Subject to any disclaimer, the term of this patent is extended or adjusted under 35 U.S.C. 154(b) by 257 days.

(21) Appl. No.: 14/405,458

(22) PCT Filed: Dec. 24, 2012

(86) PCT No.: PCT/EP2012/005374
§ 371 (c)(1),
(2) Date: Dec. 4, 2014

(87) PCT Pub. No.: WO2014/101925
PCT Pub. Date: Jul. 3, 2014

(65) Prior Publication Data
US 2015/0169493 A1    Jun. 18, 2015

(51) Int. Cl.
*G06F 13/20* (2006.01)
*G06F 13/42* (2006.01)
*H04L 12/40* (2006.01)

(52) U.S. Cl.
CPC .... *G06F 13/4221* (2013.01); *H04L 12/40032* (2013.01); *H04L 12/40104* (2013.01)

(58) Field of Classification Search
None
See application file for complete search history.

(56) References Cited

U.S. PATENT DOCUMENTS

| | | | | |
|---|---|---|---|---|
| 7,809,449 B2* | 10/2010 | Esch | ..................... | H04L 12/462 370/352 |
| 8,549,136 B2* | 10/2013 | Kalhoff | ................ | G05B 19/058 137/487.5 |
| 2004/0128588 A1* | 7/2004 | Barthel | .............. | G05B 19/4185 714/56 |
| 2009/0105849 A1* | 4/2009 | Glanzer | ................... | G05B 9/02 700/21 |
| 2010/0191875 A1* | 7/2010 | Beyer | ............... | H04L 12/40006 710/30 |
| 2012/0304292 A1* | 11/2012 | Liu | ......................... | H04L 61/30 726/22 |

(Continued)

*Primary Examiner* — Elias Mamo
(74) *Attorney, Agent, or Firm* — Hoffmann & Baron, LLP

(57) ABSTRACT

A field unit with a bus node which is designed for signal conversion between an external bus protocol and an internal bus protocol for communication with at least one function module, in such a way that a sequential transmission of data packets is made along an internal bus system and also including function modules which are designed for processing of data packets and for signal transmission with at least one downstream function component wherein the bus node is so designed for a differentiation of data packets of the higher-level control device that in the bus node a processing of non-safety-related data packets to the internal bus system and onwards transmission of safety-related data packets to the internal bus system is effected, and wherein at least one function module connected to the internal bus system is designed as a safety module for processing of safety-related data packets.

12 Claims, 2 Drawing Sheets

(56) References Cited

U.S. PATENT DOCUMENTS

2013/0111087 A1* 5/2013 Kaufleitner ............. H04L 63/16
710/106
2013/0218300 A1* 8/2013 Jartyn ................ G05B 19/0426
700/9

* cited by examiner

FIELD UNIT AND A METHOD FOR OPERATING AN AUTOMATION SYSTEM

This application claims priority based on an International Application filed under the Patent Cooperation Treaty, PCT/EP2012/005374, filed Dec. 24, 2012.

BACKGROUND OF THE INVENTION

The invention relates to a field unit with a bus node which is designed for signal conversion between an external bus protocol for communication with a higher-level control device and an internal bus protocol for communication with at least one function module, in such a way that a sequential transmission of data packets is made along an internal bus system using the internal bus protocol, and also comprising function modules which are assigned to the bus node and are designed for processing of data packets transmitted over the internal bus system and for unidirectional or bidirectional signal transmission with at least one downstream function component. The invention also relates to a method for operating such an automation system.

In DE 10 2009 042 354 A1, communications are coordinated by means of a non-safe communication master, which generates and administers the routing information for the distribution of data packets between the safe bus participants. The selection of the routing information is made on the hardware side in the connected media.

In DE 10 2009 054 157 B3, the safe communication is provided at the field bus level.

In EP 1 927 914 A2, checking of the functioning of a bus system control unit is ensured by a safety module looped into the internal bus or into a separate bus.

SUMMARY OF THE INVENTION

The problem of the invention is to specify a field unit and a method for the operation of an automation system in which, using simply structured safety-related components, both non-safety-related and also safety-related data and data packets may be passed on to function modules.

This problem is solved according to a first aspect of the invention for a field unit of the type described above by the features of claim 1. Here it is provided that the bus node is so designed for a differentiation of data packets of the higher-level control device that in the bus node a processing and/or onwards transmission of non-safety-related data packets to the internal bus system and onwards transmission of safety-related data packets to the internal bus system is effected, and that at least one function module connected to the internal bus system is designed as a safety module in such a way that processing of safety-related data packets may be carried out in this function module.

The bus node must therefore be set up to distinguish safety-related data packets provided by a control device, in particular a programmable control system also described as a PLC, via an external bus system, from non-safety-related data packets, likewise provided by this control device. An incoming non-safety-related data packet may be processed directly by the bus node and passed on via the internal bus system to function modules to be activated, in accordance with the internal bus protocol.

In the event of arrival of a safety-related data packet, the bus node does not carry out any processing of the data it contains, but instead forwards the data packet to the internal bus system, with at least its content unchanged. In the course of this onwards transmission, it is possible that the external form of the data packet may be adapted to the requirements of the internal bus protocol. In so doing, however, the bus node neither accesses nor modifies the contents of this safety-related data packet.

Because of this, according to the usual understanding in the safety engineering field, the bus node is not to be regarded as a safety-related system component and is therefore not subject to the stringent requirements set for safety-related system components in accordance with a presettable safety standard. This gives rise to considerable advantages in the design, construction and production of the bus node since, while it must meet the usual requirements for components of field units, it does not have to satisfy the demands of the presettable safety standard.

Preferably the bus node is also set up to forward to the control device, over the external bus system, safety-related data packets supplied over the internal bus system. Here too, there is no provision for change in content of the respective safety-related data packet by the bus node. If applicable, the bus node is set up to adapt the safety-related data packets supplied over the internal bus system to the requirements of the external bus protocol. In this process, the bus node makes no intervention involving the contents of the relevant safety-related data packet.

Advantageous developments of the invention are the subject of the dependent claims.

Preferably each of the function modules is provided with a bus interface for the reception and onwards transmission of data packets, and the safety module is designed for reception of safety-related data packets, also for processing and onwards transmission to function modules, in particular safety-related, via the internal bus system and in accordance with the internal bus protocol, of processed, safety-related data packets.

The function modules and therefore also the safety modules provide with their bus interfaces the electrical and/or electronic functionality for the transfer of data packets over the internal bus system. Preferably each of the function modules is equipped with at least one multipole plug connector and/or with a radio module, also with a microcontroller or microprocessor, in order to facilitate reception, where applicable processing, and onwards transmission of data packets for communication with other function modules. A data link between adjacent function modules may then be provided, wired or wireless, as appropriate.

The bus interface in the safety module or modules therefore also facilitates the incoming and onwards transmission of incoming data packets. Moreover, there takes place in the safety module, by means of a processing device which includes in particular the microcontroller or microprocessor presettable for bus communication, a processing of incoming data packets, in particular solely of incoming safety-related data packets, together with onwards transmission of data packets, in particular processed. The incoming safety-related data packets are also described as primary data packets, which are provided directly and with unchanged content by the control device to the respective safety module, where they are converted into secondary data packets by the processing provided.

Preferably the processing device in the safety module is designed to extract data from the safety-related data packets and to convert this in respect of its coding so that it can be processed by downstream safety-related function modules. The secondary safety-related data packets are forwarded over the internal bus system to downstream function modules, in particular to safety-related function modules.

The processing device of the safety module may also be designed where applicable firstly to process data from downstream function modules, in particular from safety-related function modules, and in any case to incorporate it into relevant data packets, in particular safety-related data packets, so that it can then initiate onwards transmission of these data packets over the interface and the internal bus system to the bus node, wherein the data packets may be described as primary data packets when they are provided for onwards transmission to the control device, which is the normal case.

It is expedient if the safety module has an input interface and/or an output interface for a direct, unidirectional or bidirectional, in particular electrical and/or optical, connection with a downstream function component. The function component serves in particular for the direct determination of a safety-related measured value and/or for the direct execution of a safety-related function. For example, the function component may be designed for the disconnection of a power supply for a safety-related actuator and/or may comprise a safety-related sensor, for example a position or pressure or temperature sensor. This safety-related sensor is used for example to monitor a safety-critical process, with the sensor signal processed in the safety module in order to trigger a safety function, and/or is forwarded to another safety module and/or the control device as part of a safety-related data packet.

In a development of the invention, it is provided that the safety module is designed for the processing of at least two different safety protocols. It is therefore possible to integrate the field unit, comprising the bus node and at least one safety module, in various automation systems, operating with different safety-related bus protocols such as for example CIP-Safety, PROFIsafe, FSoE (Fail Safe over EtherCAT) and OpenSafety. In the suitably designed safety module it is possible to process at least two such coded safety-related data packets, provided by a control device belonging to the automation system.

In a further variant of the invention, the safety module is designed for the processing of a freely presettable, safety-related computer program and/or for the provision of a safety-related runtime system. By this means it is possible to perform an easy adaptation of the respective safety module to different automation systems. In addition or as an alternative, processing of the safety-related data packets may be carried out in the safety module by the freely presettable safety-related computer program, so that a user of the safety module may adapt to their specific requirements. It is especially advantageous for the safety module to be designed for provision of a safety-related runtime system, in which a presettable application for the processing of data from the safety-related data packet is able to run. Through the provision of a safety-related runtime system it is possible to ensure that the one or more applications running in the safety module, involving a computer program or programs adapted to the runtime system, cannot gain unauthorised access to other functions of the safety module and compromise their mode of operation. Preferably the runtime system is so designed that applications may run in the safety module only if they are installed on and stored in the safety module from a defined source, for example from a secure database, either by wireless or wired means.

It is advantageous if the safety module is designed, in particular by means of a safety-related runtime system, for the processing of signals from safety-related function modules and/or function components, and/or from function modules and/or function components. This makes it also possible for data, in particular in the form of sensor signals originating from function modules or function components, to be integrated in data packets which are forwarded as non-safety-related or as safety-related data packets over the internal bus system to downstream function modules or to the bus node.

Preferably the bus node is assigned both function modules, designed according to a first safety level of a presettable safety standard, and also at least one safety module, designed according to a second safety level of the presettable safety standard, wherein the second safety level is designed for greater safety than the first safety level.

The problem of the invention is solved according to a second aspect of the invention by a method of operating an automation system. Provided for this automation system are a first data exchange between a higher-level control device and a bus node, in particular by means of a field bus system, a second data exchange between the bus node and at least one function module, in particular by means of an internal bus system, and a third data exchange between the function module or modules and at least one function component, in particular by means of the internal bus system, wherein from the control device and/or from at least one function module designed as safety module, data packets and safety-related data packets are supplied to the bus node, and the bus node forwards the safety-related data packets with unchanged content to the safety module or the control device wherein, in the safety module, processing of safety-related data packets takes place in such a way that safety-related data, in particular over the internal bus system, are forwarded to safety-related function modules and/or to safety-related function components, and/or safety-related data from the safety-related function modules and/or function components may be held in the safety-related data packets, so that the safety-related data packets may be forwarded to the control device via the bus node.

In a further variant of the method it is provided that the data exchange between the bus node and the function module or modules is effected by an internal bus system, in which safety-related and non-safety-related data packets are transmitted sequentially.

In a further variant of the method it is provided that the safety module, on the arrival of a safety-related data packet, undertakes a conversion of the data contained in the data packet between an external safety protocol preset by the control device and an internal safety protocol of the safety-related function modules, and then transmits a modified safety-related data packet to the safety-related function module and/or the safety-related function component and/or the control device.

In a further variant of the method it is provided that the safety module undertakes processing or automatic recognition and processing of safety-related data packets, which are coded in accordance with one of at least two different external safety protocols stored in the safety module.

In a further variant of the method it is provided that the safety module provides a runtime environment for at least one program module, in particular interchangeable, and designed for processing of the incoming data packets.

BRIEF DESCRIPTION OF THE DRAWINGS

An advantageous embodiment of the invention is shown in the drawing, including as.

DETAILED DESCRIPTION OF THE PREFERRED EMBODIMENTS

Figure 1:
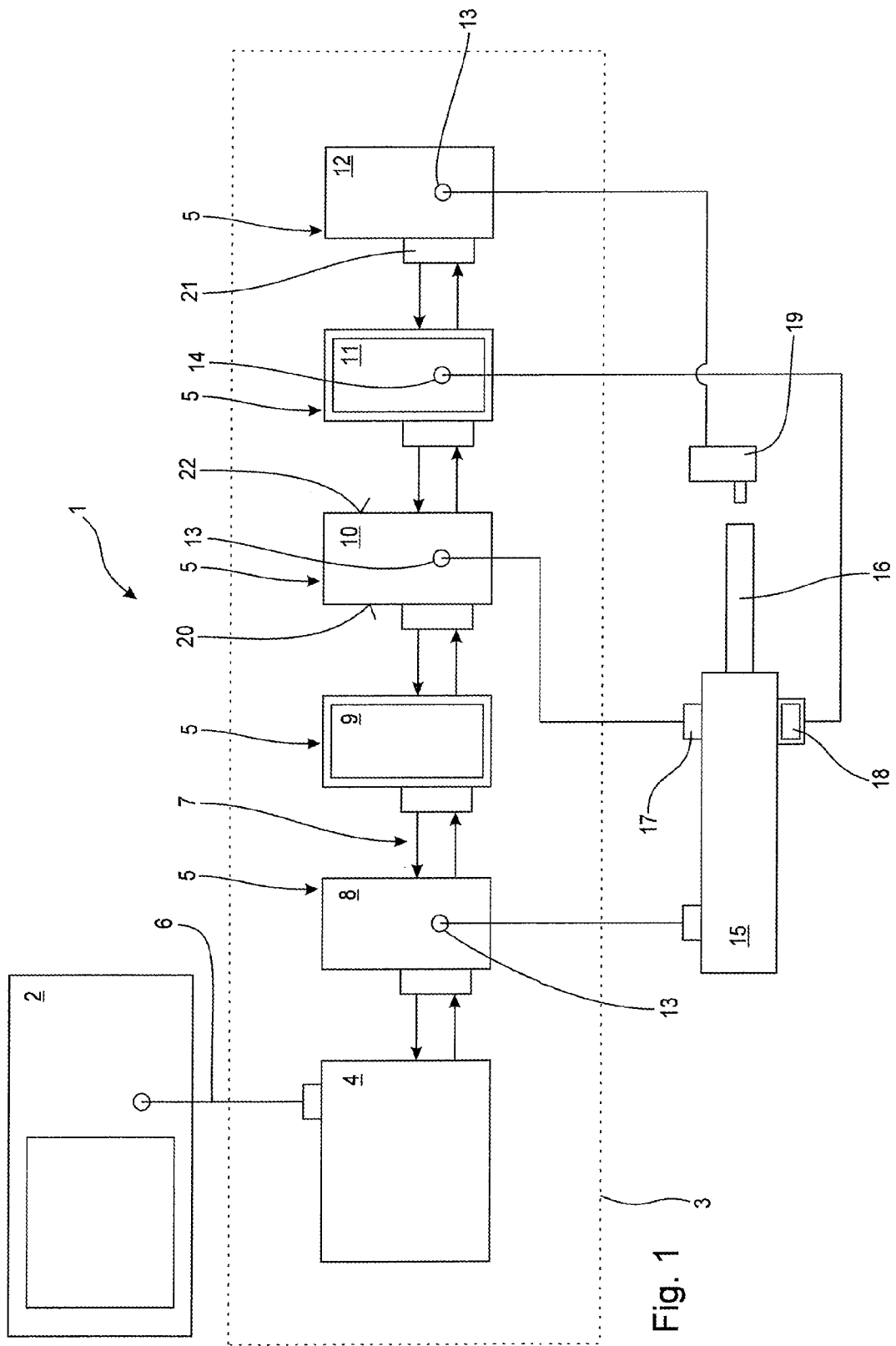
FIG. 1 a schematic view of an automation system with a higher-level control device, a bus node connected to the control device, and several function modules connected to the bus node FIG. 2 an enlarged section of FIG. 1 with an assigned diagram to illustrate the data transfer between the bus node and the function modules.

The automation system 1 shown in FIG. 1 is designed for the operation of a complex installation not shown in detail, for example a chemical reactor or an assembly cell. For this purpose, the automation system 1 includes at least one control device 2, which may in particular be in the form of a programmable control system, also described as a PLC, and which is provided for coordination of one or more field units.

By way of example, a field unit 3 is designed as an arrangement of a bus node 4 and several function modules 5 connected to the bus node 4. This involves provision for transmission, in particular wired, of preferably electrical signals between the control device 2 and the field unit 3 of an external electrical communications system 6, for example in the form of a field bus and which facilitates bidirectional signal transmission between the control device 2 and the field unit 3 in accordance with a presettable field bus protocol. Provided for transmission of signals, preferably electric, between the bus node 4 contained in the field unit 3 and the function modules 5 is an internal electrical communications system 7, in particular a proprietary communications bus.

At the same time the bus node 4 provides for signal conversion between the external field bus protocol and an internal communications bus protocol, thereby facilitating data exchange between at least one function module 5 and the control device 2. Preferably both the external field bus protocol and the internal communications bus protocol are designed to make possible sequential transmission of data packets along the respective bus systems 6, 7.

The function modules 5 are designed for different functions and are described in detail below with the functions assigned by way of example.

A first function module is designed for control of an electrical drive 15, in particular in the form of a motor controller 8, and facilitates the provision of control commands by means of an interface 13 and a cable link to this drive 15, in order to effect a linear movement of a drive rod 16 with presettable direction and/or speed of movement.

A second function module is designed as a safety module 9 and serves to process safety-related commands from the control device 2 for downstream safety-related function modules.

A third function module is designed as an input/output module 10 for the reception of sensor signals and/or to output electrical control commands over an interface 13, and is used in the field unit 3 for example to receive electrical signals from an end position switch 17, which emits a signal when the drive rod 16 reaches a presettable end position.

A fourth function module is designed as a safety-related input/output module 11, and serves to receive electrical signals from a safety-related end position switch 18, which emits a signal when the drive rod 16 reaches a presettable end position. For this purpose, the safety-related input/output module 11 is equipped with a safety-related interface 14.

A fifth function module is, like the third function module, designed as an input/output module 12 for the reception of sensor signals and/or to output electrical control commands over an interface 13 and is used in the field unit 3 for example to receive electrical signals from an end position switch 19, which emits a signal when the drive rod 16 reaches a presettable end position.

The function modules 8 to 12 communicate with one another by means of the internal communications system 7, wherein for example there is provided at each of the function modules 8 to 12 at a first side surface 20 a raised projecting plug 21, and at a second side surface 22 opposite the first side surface 20 a socket, not illustrated. Both the plug 21 and the socket are designed as electrical bus interfaces, and are electrically connected to a bus control circuit or a bus controller formed in each of the function modules 8 to 12, and not illustrated in FIGS. 1 and 2. For reasons of clarity, the function modules 8 to 12 are indicated spaced apart from one another, in order to make clear the bus communication between the function modules 8 to 12 by means of the marked arrows. In practical use, the bus node 4 and the function modules 8 to 12 form a compact unit without spaces between the bus node 4 and the function modules 8 to 12 mounted side by side upon it. In an embodiment which is not depicted, the bus node and/or the function modules are arranged with space between them and are linked to one another by connecting cables or radio links for signal transmission.

Since the automation system 1 may be used for example for the control of the electrical drive 15, and this electrical drive 15, depending on its installed position, has hazard potential for its environment, also possibly for an operator of the automation system 1, in the event of a malfunction, both the control device 2 and also the field unit 3 are set up for safety-related operation of the electrical drive 15.

For this purpose the control device 2 provides normal or non-safety-related data packets with normal non-safety-related data such as for example control commands, together with safety-related data packets with safety-related data, in particular with safety-related control commands, to the field unit 3. The field unit 3 is set up to process the data packets and the safety-related data packets and, as appropriate, to return data packets, in particular safety-related data packets, to the control device 2, for example in the event of a fault in the electrical drive 15.

In order to ensure safety-related functioning of the field unit 3, one might consider making all components of the field unit 3 as safety-related components. Since however the range of components, in particular the function modules, is large, also different field bus protocols are used for communication between different control devices 2 and the field unit 3, designing the entire field unit 3 as a safety-related field unit 3 would involve considerable expense and require constant adaptation to the respective field bus protocol.

Figure 2:
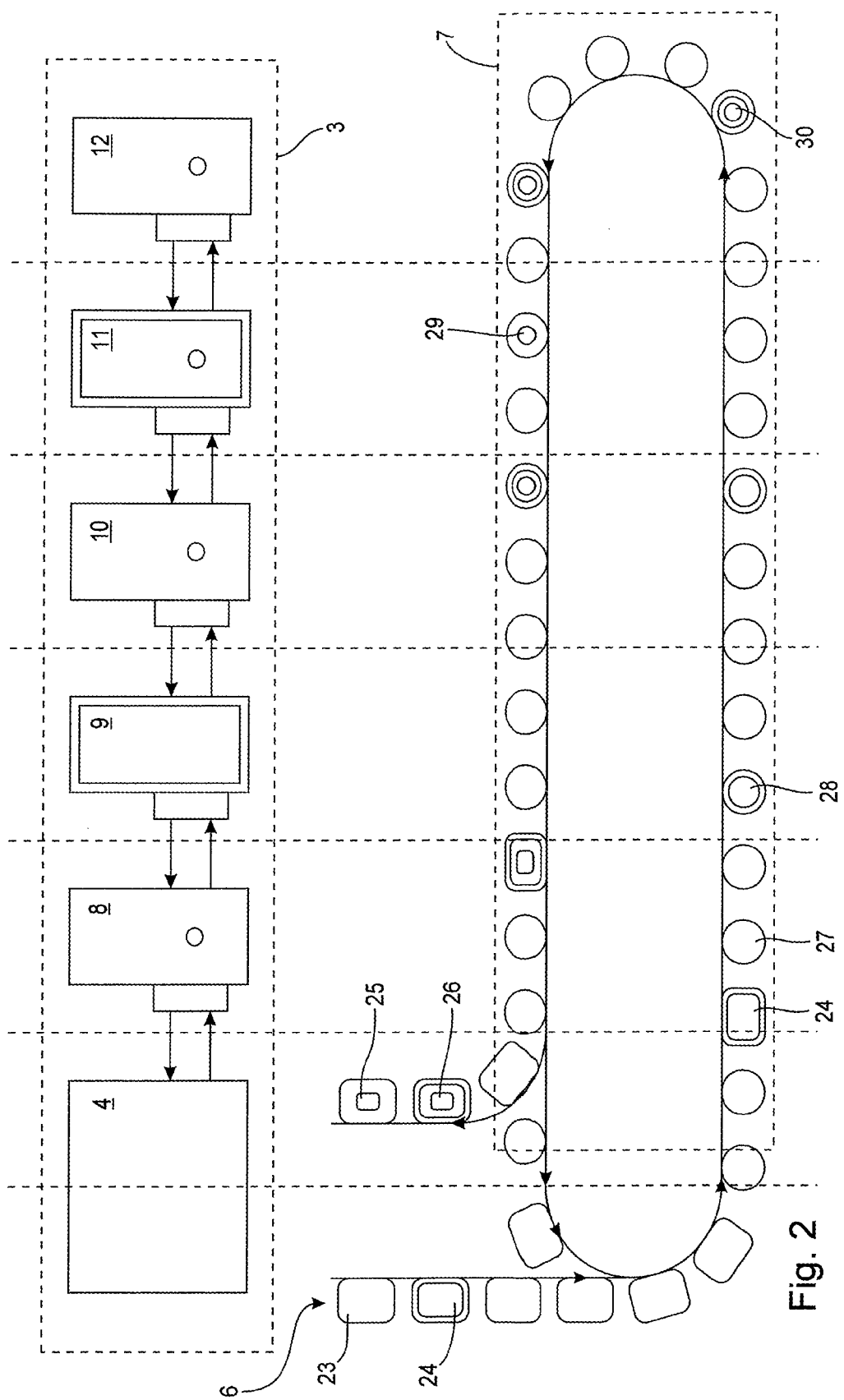

The safety-related automation system 1, as shown schematically in FIGS. 1 and 2, is based on the concept that safety-related data packets are processed by a function module designed as a safety module 9, and forwarded to connected safety-related function modules such as the safety-related input/output module 11. At the same time the bus node 4 is set up so as to recognise incoming safety-related data packets. It does not process at least these data packets, but instead forwards them with unchanged content to the internal communications system 7. Preferably the bus node 4 is set up so that it forwards unprocessed, in addition to the safety-related data packets, other non-safety-related data packets, in particular those which are suitable marked.

This mode of operation of the automation system 1 is reproduced in very schematic form in FIG. 2. Here the internal communications system 7 is shown as an open loop, along which variously marked data packets are forwarded from the bus node 4 to the function modules 5, and are returned from the function modules 5 to the bus node 4. Via the bus node 4, data packets from an external communication system, for example a field bus system, may be fed into the internal communications system 7. Also, with the aid of the bus node 4, data packets from the internal communications system 7 may be output to the external communication system.

The external communications system 6 connected to the control device 2 not depicted in FIG. 2 is set up to transmit differently marked data packets. The control commands issued by the control device 2 may be transmitted in external data packets 23, which are supplied to the bus node 4. Safety-related control commands of the control device 2 are transmitted to the bus node 4 in external safety-related data packets 24.

The external data packets 23 are processed in the bus node 4, depending on the coding of the chosen field bus protocol, and the data contained therein are forwarded via the internal communications system 7 to the function modules 5 to be activated by it, in internal data packets 27. On receiving external safety-related data packets 24 the bus node 4 is set up to forward them with unchanged content to the internal communications system 7. This is illustrated in FIG. 2 by the fact that the external safety-related data packets 24 are also forwarded via the internal communications system 7.

Depending on the design of the external and internal communication systems 6 and 7, it may be necessary to make adjustments to the incoming external safety-related data packets 24, so that the latter can be forwarded over the internal communications system 7. Such adjustments however always relate only to the external configuration of the respective safety-related data packet 24, not to its content.

The external safety-related data packets 24 forwarded over the internal communications system 7 are opened and processed only on reaching the safety module 9. Here the safety module 9 may be set up to process external safety-related data packets 24 which are coded in accordance with different field bus protocols and the respective safety protocols such as for example CIP-Safety, PROFIsafe, FSoE and OpenSafety.

The choice of field bus protocol to be processed may be made for the safety module 9 by one of the following: hardware specification, software specification, automatic recognition. A hardware specification may be made for example with the aid of non-illustrated selection switches (e.g. DIP switch). A software specification may be made by activating the relevant processing algorithm in the bus node 4 by means of an external programming device and a wired or wireless data transmission between the programming device and the bus node. For example, with the aid of an external computer on which a suitable selection program is run, a selection of the field bus protocol used and of the safety-related protocol linked to the former may be made. This choice may be transmitted to the safety module 9 directly or over the internal communications system 7. It is especially advantageous for at least two different safety protocols, for example at least two safety protocols from the group comprising CIP-Safety, PROFIsafe, FSoE and OpenSafety to be stored in the safety module 9, with automatic detection by the safety module 9 of the safety protocol used.

The data of the external safety-related data packets 24 processed in the safety module are incorporated in internal safety-related data packets 28 for communication with downstream safety-related function modules 5, and then forwarded via the internal communications system 7.

In the course of transmission via the internal communications system 7, the data packets pas through all function modules 5. This may involve, for example, in the input/output module 10, data obtained from sensor signals of the end position switch 17 being incorporated in an internal data packet 27. At the same time, modified internal data packets 29 are formed, and are forwarded over the internal communications system 7. The modified internal data packets 29 may be converted in the bus node 4 into modified external data packets 25, for forwarding over the external communications system 6 to the control device 2.

Internal safety-related data packets 28 may be modified only by suitably configured safety-related function modules 5 such as the input/output module 11, for example by incorporating data emanating from sensor signals of the safety-related end position switch 18. The safety-related data packets 28 are converted by the incorporation of data into modified safety-related data packets 30, which forwarded on to the bus node 4 over the internal communications system 7.

For example it is provided that the modified safety-related data packets 30, in the course of forwarding by the safety module 9, are converted into external safety-related data packets 26, which are forwarded on by the internal communications system 7 to the bus node 4, and there handed over to the external communications system 6 for direction to the control device 2.

In a first embodiment, the safety module 9 is designed solely for conversion of the external safety-related data packets 24 into internal safety-related data packets 28. There is no provision for any data processing in the safety module 9 going beyond this conversion of the data packets 24, 28. Where applicable, there is also provision in the safety module 9 for conversion of the internal safety-related data packets 28 into external safety-related data packets 24, while here too no data processing takes place beyond conversion of the data packets 24, 28.

In a second embodiment, the safety module 9 is designed both for conversion of the data packets 24, 28, and also for processing the data contained in the data packets 24 and/or 28, wherein the algorithm needed for processing the data is filed, in particular so as to be unalterable, in a memory of the safety module 9, and retrieved as required by a processor of the safety module 9.

In a third embodiment, the safety module includes at least a runtime system, i.e. a run environment for a computer program to be fed in from outside, also described as an "application" or "app". Here the runtime system is preferably designed to be safety-related, therefore allowing only such output of data and/or access to data by the computer program to be fed in from outside to processing operations running internally in the safety module 9, as will not lead to any endangering of the safety-related functioning of the safety module 9.

In an embodiment which is not illustrated, the safety module is designed for direct communication with a safety-related function component and is provided for this purpose with a suitable interface.

The invention claimed is:

1. A field unit comprising a bus node, an internal bus protocol and a plurality of data processing devices, the bus node being designed for signal conversion between an external bus protocol for communication with a higher-level control device and the internal bus protocol being designed for communication with the plurality of data processing devices, in such a way that a sequential transmission of data packets is made along an internal bus system using the internal bus protocol,
- wherein at least one upstream data processing device of the plurality of data processing devices is assigned to the bus node and is designed for processing of data packets transmitted over the internal bus system and for unidirectional or bidirectional signal transmission with at least one downstream data processing device of the plurality of data processing devices, and
- wherein the bus node is so designed for distinguishing safety-related data packets from non-safety related data packets of the transmitted data packets of the higher-level control device, and
- wherein, in the bus node, a processing and/or onwards transmission of non-safety-related data packets to the internal bus system and onwards transmission of safety-related data packets to the internal bus system is effected, and
- wherein the plurality of data processing devices comprises at least one safety-related data processing device connected to the internal bus system in such a way that processing of safety-related data packets may be carried out in this safety-related data processing device, and
- wherein the safety-related data processing device, on the arrival of a safety-related data packet, undertakes a conversion of the data contained in the data packet between an external safety protocol pre-set by the control device and an internal safety protocol of the safety-related data processing device, and then transmits a modified safety-related data packet to another safety-related data processing device and/or a safety-related function component selected from the group consisting of a sensor and a switch and/or the control device.

2. The field unit according to claim 1, wherein each of the data processing devices is provided with a bus interface for the reception and onwards transmission of data packets, and the safety-related data processing device is designed for reception of safety-related data packets, also for processing and onwards transmission to other data processing devices, via the internal bus system and in accordance with the internal bus protocol, of processed, safety-related data packets.

3. The field unit according to claim 1, wherein the safety-related data processing device has an input interface and/or an output interface for direct unidirectional or bidirectional connection with a downstream function component selected from the group consisting of a sensor and a switch.

4. The field unit according to claim 1, wherein the safety-related data processing device is designed for processing of at least two different safety protocols.

5. The field unit according to claim 1, wherein the safety-related data processing device is designed for processing of a freely pre-settable safety-related computer program and/or for provision of a safety-related runtime system.

6. The field unit according to claim 1, wherein the safety-related data processing device is designed for processing of signals from other safety-related data processing devices and/or function components selected from the group consisting of a sensor and a switch.

7. The field unit according to claim 1, wherein the bus node is assigned both data processing devices, designed in accordance with a first safety level of a pre-settable safety standard, and at least one safety-related data processing device, designed in accordance with a second safety level of a pre-settable safety standard, wherein the second safety level is designed for a greater degree of safety than the first safety level.

8. A method of operating an automation system in which are provided a first data exchange between a higher-level control device and a bus node, a second data exchange between the bus node and a plurality of data processing devices and a third data exchange between at least one of the plurality of data processing devices and at least one function component selected from the group consisting of a sensor and a switch,
- wherein, from the control device and/or from at least one safety-related data processing device of the plurality of data processing devices, data packets and safety-related data packets are supplied to the bus node, and the bus node forwards the safety-related data packets with unchanged content to the at least one safety-related data processing device or the control device, and
- wherein, in the safety-related data processing device, processing of safety-related data packets takes place in such a way that safety-related data are forwarded to other safety-related data processing devices and/or to safety-related function components selected from the group consisting of a sensor and a switch, and/or safety-related data from the safety-related data processing devices and/or function components selected from the group consisting of a sensor and a switch may be held in the safety-related data packets, so that the safety-related data packets may be forwarded to the control device via the bus node, and
- wherein the safety-related data processing device, on the arrival of a safety-related data packet, undertakes a conversion of the data contained in the data packet between an external safety protocol pre-set by the control device and an internal safety protocol of the safety-related data processing device, and then transmits a modified safety-related data packet to other safety-related data processing devices and/or the safety-related function component selected from the group consisting of a sensor and a switch and/or the control device.

9. The method according to claim 8, wherein the data exchange between the bus node and the safety-related data processing device is effected by an internal bus system, in which safety-related and non-safety-related data packets are transmitted sequentially.

10. The method according to claim 8, wherein the safety-related data processing device undertakes processing or automatic recognition and processing of safety-related data packets, which are coded in accordance with one of at least two different external safety protocols stored in the safety-related data processing device.

11. The method according to claim 8, wherein the safety-related data processing device provides a runtime environment for at least one program module, and wherein the program module is designed for processing of the incoming data packets.

12. The field unit according to claim 6, wherein the safety-related data processing device includes a safety-related runtime system for processing of the signals from the other safety-related data processing devices and/or the function components selected from the group consisting of a sensor and a switch.

* * * * *